United States Patent
Sims et al.

(10) Patent No.: US 7,630,820 B2
(45) Date of Patent: Dec. 8, 2009

(54) FEEDBACK CONTROL SYSTEM AND METHOD THAT SELECTIVELY UTILIZES OBSERVER ESTIMATES

(75) Inventors: Jay R. Sims, Chandler, AZ (US); Richard Ling, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 409 days.

(21) Appl. No.: 11/739,461

(22) Filed: Apr. 24, 2007

(65) Prior Publication Data

US 2008/0270003 A1    Oct. 30, 2008

(51) Int. Cl.
   *G06F 19/00* (2006.01)
(52) U.S. Cl. .................. 701/100; 701/54; 701/101; 477/30
(58) Field of Classification Search .......... 701/53, 701/54, 61, 100, 101; 477/30, 54; 60/39.281, 60/773
   See application file for complete search history.

(56) References Cited

U.S. PATENT DOCUMENTS

| | | | |
|---|---|---|---|
| 3,851,157 A | 11/1974 | Ellis | |
| 4,249,238 A | 2/1981 | Spang, III et al. | |
| 4,423,594 A | 1/1984 | Ellis | |
| 4,478,038 A * | 10/1984 | Cropper et al. | 60/773 |
| 4,794,755 A * | 1/1989 | Hutto et al. | 60/39.281 |
| 5,680,409 A | 10/1997 | Qin et al. | |
| 6,356,857 B1 | 3/2002 | Qin et al. | |
| 6,553,324 B2 | 4/2003 | Langmeier et al. | |
| 6,556,939 B1 | 4/2003 | Wegerich | |
| 6,594,620 B1 | 7/2003 | Qin et al. | |
| 6,751,575 B2 | 6/2004 | Lenz et al. | |
| 6,804,600 B1 | 10/2004 | Uluyol et al. | |
| 6,876,943 B2 | 4/2005 | Wegerich | |
| 7,006,900 B2 | 2/2006 | Zhenduo et al. | |
| 2007/0073525 A1 | 3/2007 | Healy et al. | |

FOREIGN PATENT DOCUMENTS

| EP | 1420153 A2 | 5/2004 |
|---|---|---|
| GB | 1597129 | 9/1981 |

OTHER PUBLICATIONS

Kreiner, Dr. A., Lietzau, K.; The Use Of Onboard Real-Time Models For Jet Engine Control; MTU Aero Engines, Germany, pp. 1-27.
Birouche, A., Daafouz, J., Iung, C.; Observer Design For A Class Of Discrete Time Piecewise-Linear Systems; Preprints of the 2nd IFAC Conf. on Analysis and Design of Hybrid Systems, Alghero, Italy, Jun. 7-9, 2006, pp. 12-17.
N. Sugiyama, System Identification Of Jet Engines, Journal of Engineering for Gas Turbines and Power, Jan. 2000, vol. 122.

* cited by examiner

*Primary Examiner*—Gertrude Arthur Jeanglaud
(74) *Attorney, Agent, or Firm*—Ingrassia Fisher & Lorenz, P.C.

(57) ABSTRACT

A system and method implements improved machine performance, most preferably for gas turbine engines. The system and method implement a control law that receives sensed operational parameter feedback signals. For each sensed engine operational parameter, the feedback signals that are supplied to the control law selectively comprise the sensor signal representative of the engine operational parameter, if the sensor signal is valid, or an observer estimate of the sensed engine operational parameter, if the sensor signal is invalid.

21 Claims, 3 Drawing Sheets

FEEDBACK CONTROL SYSTEM AND METHOD THAT SELECTIVELY UTILIZES OBSERVER ESTIMATES

STATEMENT REGARDING FEDERALLY SPONSORED RESEARCH OR DEVELOPMENT

This invention was made with Government support under FA8650-04-2-2412 awarded by the Air Force Research Laboratory (AFRL). The Government has certain rights in this invention.

TECHNICAL FIELD

The present invention generally relates to machine feedback control systems and methods and, more particularly, to a feedback control system and method, such as for a gas turbine engine, that selectively utilizes observer estimates.

BACKGROUND

A typical feedback control system includes a plant and a controller. The plant may be a machine or other device, the operation of which is desired to be controlled. The controller receives an input reference or command signal and one or more feedback signals representative of one or more outputs of the plant. The controller, via a suitable control law, processes these signals and supplies one or more signals to the plant so that the plant operates consistent with the input command signal. Feedback control systems, such as this, have been, and continue to be, implemented in numerous and varied environments to control various types of machines. For example, most aircraft include one or more gas turbine engine control systems to control, for example, aircraft propulsion engines.

A gas turbine engine control system typically includes a plurality of actuators, a plurality of sensors, and an engine controller. The actuators are used to control the position or speed of one or more controlled components, to thereby control various engine parameters, such as fuel flow and guide vane position, that affect engine operation. The sensors measure various engine performance parameters, such as turbine rotational velocities, engine pressures, and engine temperatures, and various controlled parameters, such as fuel flow and inlet guide vane positions, and supply feedback signals representative thereof to the engine controller. The engine controller typically receives engine commands and the feedback signals from the sensors and, using a suitable engine control law, generates and supplies appropriate actuator commands to the actuators, to thereby control engine operation.

Although control systems, such as the ones described above, generally operate safely and robustly, these systems can exhibit certain drawbacks. For example, in the unlikely event that one or more of the sensor signals is lost or otherwise invalid, machine performance and/or control can be degraded. Hence, there is a need for a control system and method that can accommodate a lost or invalid sensor signal without resulting in degraded machine performance and/or control, and most notably when the machine is an aircraft gas turbine engine.

BRIEF SUMMARY

In one embodiment, and by way of example only, a control system for a gas turbine engine including a plurality of actuators includes an engine control law, a gas turbine engine observer, and a feedback signal selection function. The engine control law is adapted to receive input commands and a plurality of feedback signals. Each feedback signal is representative of a sensed engine operational parameter. The engine control law is operable, in response to the input commands and the plurality of feedback signals, to supply engine actuator commands. The gas turbine engine observer is adapted to receive the engine actuator commands and a plurality of sensor signals and is operable, in response thereto, to supply estimates of each of the sensed engine operational parameters. Each sensor signal is representative of one of the sensed engine operational parameters. The feedback signal selection function is adapted to receive the estimates of the sensed engine operational parameters and the plurality of sensor signals. The feedback signal selection function is configured to selectively supply each of the feedback signals representative of a sensed engine operational parameter as either the sensor signal representative thereof or the estimate thereof.

In another exemplary embodiment, a method of controlling a gas turbine engine having engine actuators includes sensing engine operational parameters and supplying, for each sensed engine operational parameter, a sensor signal representative thereof. A gas turbine engine observer is generated that is responsive to engine actuator commands and at least some of the sensed engine operational parameters to supply estimates of each sensed engine operational parameter. The engine actuator commands are supplied from an engine control law to the gas turbine engine observer and to the engine actuators. A determination is made as to whether each of the sensor signals is invalid. For each of the sensed engine operational parameters, a feedback signal representative thereof is supplied to the engine control law. The supplied feedback signal is the sensor signal representative of the engine operational parameter if the sensor signal is valid, and is the estimate of the sensed engine operational parameter if the sensor signal is invalid.

In yet a further exemplary embodiment, a gas turbine engine system includes a gas turbine engine and an engine controller. The gas turbine engine includes a plurality of actuators and a plurality of sensors. Each sensor is operable to sense an engine operational parameter and supply a sensor signal representative thereof. The engine controller is coupled to the gas turbine engine and is adapted to receive input commands and a plurality of feedback signals. Each feedback signal is representative of a sensed engine operational parameter. The engine controller is operable, in response to the input commands and the plurality of feedback signals, to supply at least engine actuator commands to the plurality of engine actuators. The engine controller includes an engine control law, a gas turbine engine observer, and a feedback signal selection function. The engine control law is adapted to receive the input commands and the plurality of feedback signals and is operable, in response thereto, to supply the engine actuator commands. The gas turbine engine observer is adapted to receive the engine actuator commands and at least a portion of the sensor signals and is operable, in response thereto, to supply estimates of each of the sensed engine operational parameters. The feedback signal selection function is adapted to receive the estimates of the sensed engine operational parameters and each of the sensor signals. The feedback signal selection function is configured to selectively supply each of the feedback signals representative of a sensed engine operational parameter as either the sensor signal representative thereof or the estimate thereof.

Furthermore, other desirable features and characteristics of the control system and method will become apparent from the subsequent detailed description and the appended claims, taken in conjunction with the accompanying drawings and this background.

BRIEF DESCRIPTION OF THE DRAWINGS

The preferred embodiments will hereinafter be described in conjunction with the following drawing figures, wherein like numerals denote like elements, and wherein.

DETAILED DESCRIPTION OF PREFERRED EMBODIMENTS

The following detailed description is merely exemplary in nature and is not intended to limit the invention or the application and uses of the invention. Furthermore, there is no intention to be bound by any theory presented in the preceding background or the following detailed description. In this regard, although the following description is directed toward a preferred control system and method for a gas turbine engine, it will be appreciated that the system and method can extend to other machines.

Figure 1:
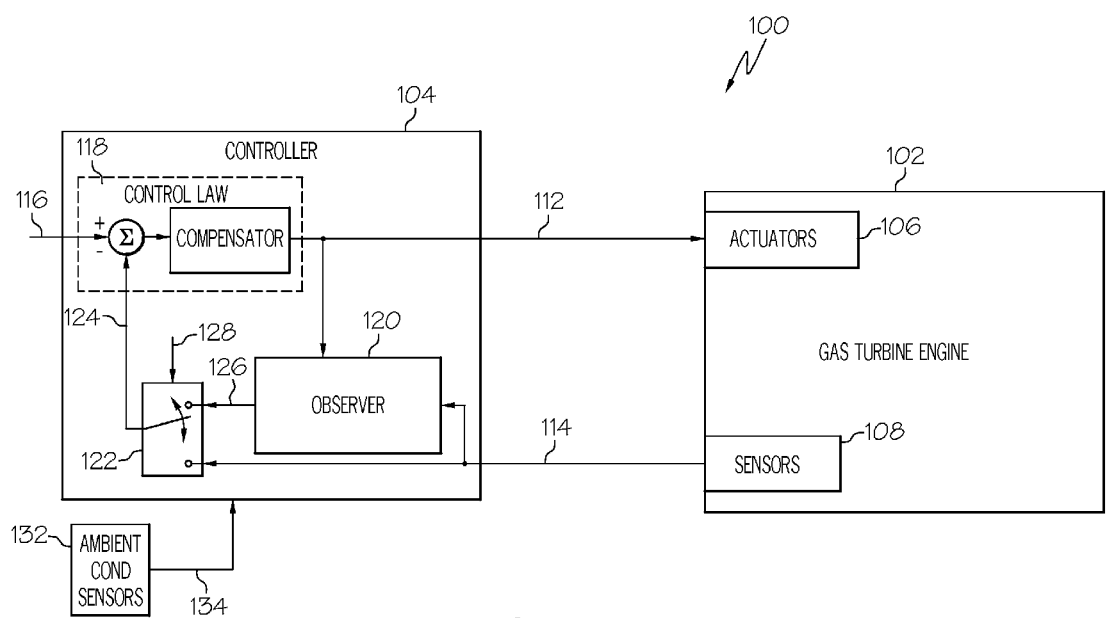
FIG. 1 is a functional block diagram of an exemplary feedback control system according to an embodiment of the invention.

Turning now to FIG. 1, a functional block diagram of a feedback control system 100 is depicted, and includes a plant 102 and a controller 104. In the depicted embodiment, the plant 102 is a gas turbine engine, and may be implemented as any one of numerous types of propulsion, power, or propulsion and power gas turbine engines. Some exemplary gas turbine engine implementations include turbofan engines, turboprop engines, and auxiliary power units (APUs), just to name a few. As was noted above, however, the plant 102 may be implemented as any one of numerous other machines.

In any case, the gas turbine engine, at least in the depicted embodiment, includes one or more actuators 106 and one or more sensors 108. The actuators 106 are each coupled to receive appropriate actuator commands 112 from the controller 104. In response to the received actuator commands 112, the actuators 106 control the position of one or more non-illustrated engine components, to thereby control one or more engine variables and, concomitantly, to control engine operation. It will be appreciated that the engine variables may include, for example, fuel flow, inlet guide vane position, and bleed air flow, just to name a few. It will be appreciated that the actuators 106 may be implemented using any one of numerous actuators suitable for controlling these variables including, for example, electrical, electromechanical, electro-hydraulic, or electro-pneumatic type actuators, just to name a few.

The sensors 108 are each configured to sense an engine operational parameter and to supply a sensor signal 114 representative of the sensed engine operational parameter. It will be appreciated that the sensed engine operational parameters may include, for example, parameters representative of engine performance and parameters representative of controlled engine parameters. The engine performance parameters may include, for example, various temperatures and pressures within the engine 102, and the rotational speeds of various engine components. The controlled engine parameters may include, for example, fuel flow rate and inlet guide vane position. It will additionally be appreciated that the sensors 108 may be implemented using any one of numerous sensing devices suitable for sensing the desired engine operational parameters. Some exemplary sensors include, for example, various types of pressure sensors, temperature sensors, speed sensors, position sensors, and vibration sensors, just to name a few. No matter the particular number and type of sensors 108 that are used, at least some of the sensors 108 supply sensor signals 114 to the controller 104.

The controller 104, which may be implemented within an engine controller, such as a Full Authority Digital Engine Controller (FADEC) or other electronic engine controller (EEC), is coupled to receive input commands 116 and at least some of the sensor signals 114. The input commands 116 may be supplied from, for example, a non-illustrated engine thrust control lever in a non-illustrated aircraft cockpit. The controller 104, in response to the input commands 116 and the received sensor signals 114, supplies the actuator commands 112 to the actuators 106. To implement this functionality, the controller 104 includes a control law 118, a gas turbine engine observer 120, and a feedback signal selection function 122.

The control law 118, which may be implemented using any one of numerous known types of engine control laws 118, is coupled to receive the input commands 116 and a plurality of feedback signals 124. The engine control law 118, upon receipt of these signals 116, 124, determines and supplies appropriate engine actuator commands 112 to the appropriate actuators 106 and to the observer 120. The gas turbine engine observer 120 is coupled to receive the engine actuator commands 112 from the engine control law 118, and the sensor signals 114 from the plurality of sensors 108. The gas turbine engine observer 120 is operable, in response to these signals 112, 114, to supply estimates 126 of each of the sensed engine operational parameters to the feedback signal selection function 122.

The feedback signal selection function 122 is coupled to receive the estimates 126 of the sensed engine operational parameters and at least some of the sensor signals 114, and supplies the feedback signals 124 to the control law 118. More specifically, the feedback signal selection function 122 is configured to selectively supply, for each engine operational parameter that comprises the feedback signals 124, either the sensor signal 114 that is representative of the sensed engine operational parameter or the estimate 126 of the sensed engine operational parameter. It will be appreciated that the feedback signal selection function 122 may be implemented as any one of numerous suitable devices to implement this functionality. For example, it may be configured as a switching device or a multiplexing device that is responsive to one or more control signals 128, which may be generated by the control law 118 or other non-illustrated device or system. Preferably, and as will be described in more detail further below, the feedback signal selection function 122 is controlled in such a manner that the sensor signals 114 normally comprise the feedback signals 124. However, if one or more of the sensor signals 114 that comprise the feedback signals 124 is either lost or invalid, then the feedback signal selection function 122 is controlled such that the estimate 126 of the sensed engine operational parameter corresponding to each of the lost or invalid sensor signals 114 comprises the feedback signals 124. Before discussing this in more detail, however, a more detailed description of the gas turbine engine observer 120 will now be provided.

Figure 2:
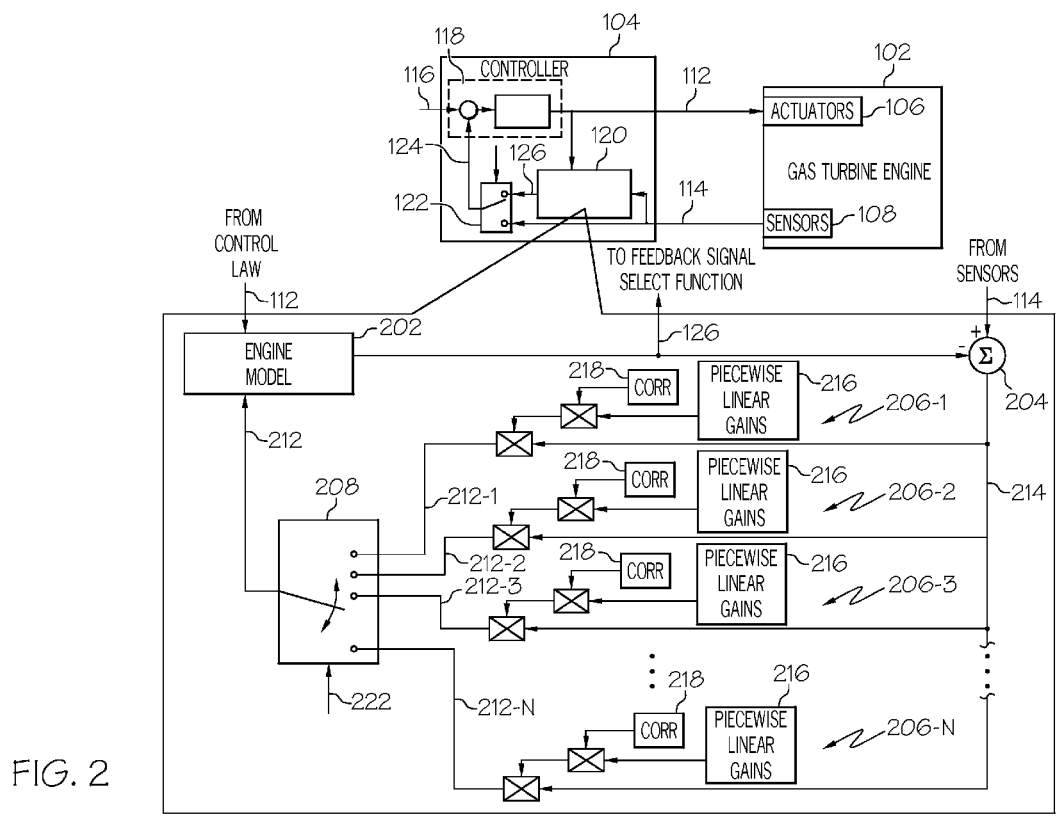
FIG. 2 is a functional block diagram of the system of FIG. 1, depicting a portion thereof in more detail.

Turning now to FIG. 2, it is seen that the gas turbine engine observer 120 includes an engine model 202, a residual generator 204, a plurality of gain channels 206 (e.g., 206-1, 206-2, 206-3, ... 206-N), and a mode select function 208. The engine model 202, which is preferably a non-linear component map software model of the gas turbine engine 102 and is preferably stored within the controller 104, receives the actuator commands 112 supplied from the control law 118 and state biases 212 that are supplied from the mode select function 208. The engine model 202, in response to the actuator commands and the state biases 212, updates itself and generates the estimates 126 of the sensed engine operational parameters. These estimates 126, as noted above, are supplied to the feedback signal selection function 122 and, as depicted in FIG. 2, are also supplied to the residual generator 204.

The residual generator 204 is coupled to receive the estimates 126 supplied from the engine model 202 and the same sensor signals 114 that are supplied from the sensors 108 to the feedback signal selection function 122. The residual generator 204, which is preferably configured to implement a comparator function, generates residuals 214 that are each representative of a difference between an estimate 126 and the corresponding sensor signal 114. The residuals 214 are then supplied to each of the gain channels 206.

The gain channels 206 each include a plurality of piecewise linear gains 216 that are selectively applied to the generated residuals 214. It will be appreciated that the piecewise linear gains 216 in each channel may vary as a function of one or more engine parameters such as, for example, engine speed. Moreover, the piecewise linear gains 216 in each channel 206 preferably differ from other channels to compensate for an invalid sensor signal 114. For example, in the depicted embodiment the piecewise linear gains 216 in first gain channel 206-1 correspond to normal operation, when none of the sensor signals 114 are invalid, and the piecewise linear gains 216 in each of the remaining gain channels 206-2, 206-3, . . . 206-N correspond to one or more of the sensor signals 114 being invalid.

Before proceeding further, it is noted that an invalid sensor signal 114 may include a complete loss of the sensor signal 114, and result from any one of numerous factors. For example, the sensor 108, the sensor processing circuitry, and/or the interconnection between the sensor 108 and the controller 104, associated with the invalid sensor signal 114 may be failed, malfunctioning, or otherwise inoperable. In any event, the invalid condition is preferably detected within the controller 104 using known devices and methods for detecting such occurrences.

Returning once again to the description, it is noted that each gain channel 206 additionally includes ambient condition corrections 218. The ambient condition corrections 218 correct the applied piecewise linear gains 216 based on one or more ambient operating conditions. These ambient operating conditions may vary and may include, for example, various flight conditions, such as altitude, mach number, angle of attack, temperature, and pressure, just to name a few. It will be appreciated that one or more of these ambient operating conditions, such as temperature and pressure, may be calculated or otherwise determined from one or more other ambient operating conditions. Preferably, as FIG. 1 depicts, the system 100 may additionally include a plurality of ambient condition sensors 132 that are operable to sense an ambient condition associated with the gas turbine engine and supply an ambient condition signal 134 representative thereof to the controller 104. These signals 134, or signals representative thereof, are supplied to the ambient condition corrections 218, which in turn apply appropriate corrections to the piecewise linear gains 216.

The output of each gain channel 206 is a set of state biases 212 (212-1, 212-2, 212-3, . . . , 212-N), which are supplied to the mode select function 208. The mode select function 208 is configured to selectively supply the state biases 212 to the engine model 202. More specifically, the mode select function 208 is preferably configured to supply the state biases 212 associated with the sensor signals 114 that are valid to the engine model 202. To do so, the mode select function 208 is coupled to receive a gain channel select signal 222 and is operable, in response thereto, to supply the state biases 212 from one of the gain channels 206 to the engine model 202. It will be appreciated that the channel select signal 222 may be generated by the control law 118, the observer 120, or other non-illustrated device or system. It will additionally be appreciated that the mode select function 208, like the feedback signal selection function 122, may be implemented as any one of numerous suitable devices including, for example, a switching device or a multiplexing device that is responsive to the channel select signal 222.

Figure 3:
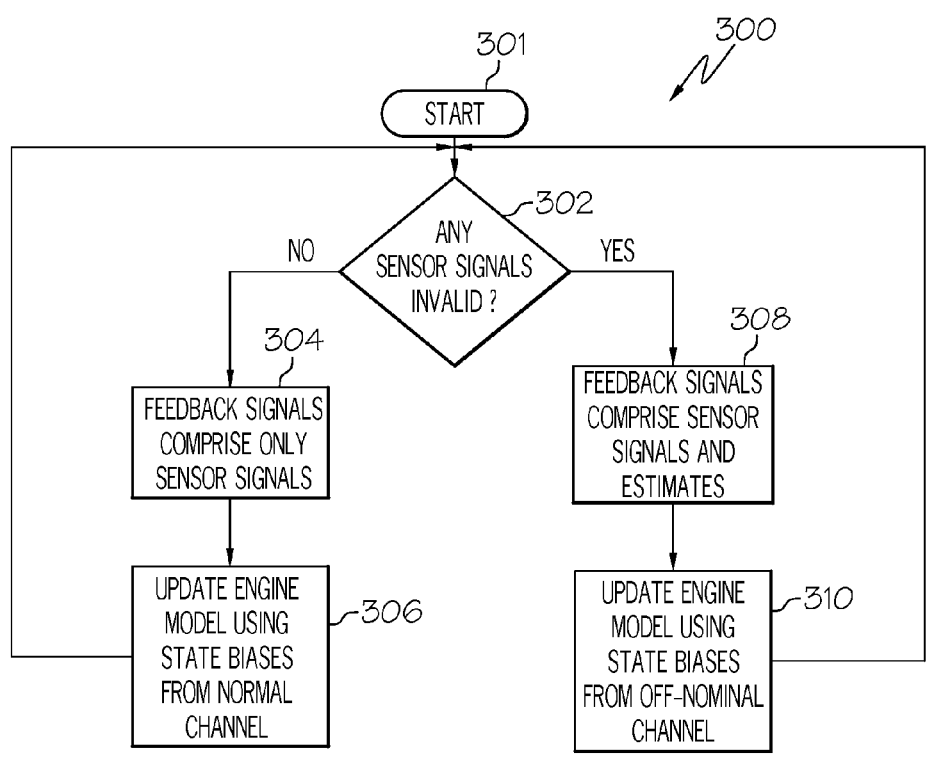
FIG. 3 depicts an exemplary method, in flowchart form, that may be implemented by the system depicted in FIGS. 1 and 2.

Having described the system 100 from a structural and functional standpoint, and having described the operation of the individual components that comprise the system 100, a more detailed description of the control methodology implemented of the system 100 will now be provided. In doing so, reference should be made to FIG. 3, which depicts the control methodology 300 in flowchart form, and to FIGS. 1 and 2 as necessary. It should be noted that the parenthetical references in the following description correspond to the particular reference numerals in the flowchart.

Turning now to a description of the methodology 300, it is seen that during system 100 operation, the controller 104 continuously makes a determination, for each sensor signal 114, as to whether the sensor signal 114 is invalid (302). If none of the sensor signals 114 are invalid, then feedback signals 124 supplied from the feedback signal selection function to the control law 118 comprise only sensor signals 114 (304). In addition, the engine model 202 is updated using the state biases 212 associated with the gain channel 206 that corresponds to normal operation (e.g., 206-1) (306). Conversely, if one or more of the sensor signals 114 are invalid, then the feedback signals 124 supplied to the control law 118 comprise both sensor signals 114 and estimates 126, or just estimates (in the highly unlikely event all of the sensor signals are invalid) (308). In addition, the engine model 202 is updated using the state biases 212 associated with the gain channel 206 that corresponds to this particular off-nominal condition (e.g., 206-2, 206-3, . . . or 206-N) (310).

The system and method described herein provide improved performance over presently known feedback control systems and methods, most notably those used to implement gas turbine engine control. With the system and method described herein, the sensed engine operational parameter feedback signals supplied to the control law selectively comprise, for each sensed engine operational parameter, the sensor signal representative of the engine operational parameter, if the sensor signal is valid, or estimate of the sensed engine operational parameter, if the sensor signal is invalid.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A control system for a gas turbine engine including a plurality of actuators, the system comprising:
an engine control law adapted to receive input commands and a plurality of feedback signals, each feedback signal representative of a sensed engine operational parameter, the engine control operable, in response to the input commands and the plurality of feedback signals, to supply engine actuator commands;
a gas turbine engine observer adapted to receive the engine actuator commands and a plurality of sensor signals, each sensor signal representative of one of the sensed engine operational parameters, the gas turbine engine observer operable, in response to the engine actuator commands and the plurality of sensor signals, to supply estimates of each of the sensed engine operational parameters; and
a feedback signal selection function adapted to receive the estimates of the sensed engine operational parameters and the plurality of sensor signals, the feedback signal selection function configured to selectively supply each of the feedback signals representative of a sensed engine operational parameter as either (i) the sensor signal representative thereof or (ii) the estimate thereof.

2. The system of claim 1, further comprising:
a sensor fault determination function coupled to receive the plurality of sensor signals and operable, in response thereto, to (i) determine if each of the sensor signals is invalid and (ii) supply feedback control signals representative of the determination to the feedback signal selection function,
wherein the feedback signal selection function is responsive to the feedback control signals such that each of the feedback signals supplied thereby to the control law is (i) the sensor signal representative of the sensed engine operational parameter if the sensor signal is valid and (ii) the estimate of the sensed engine operational parameter if the sensor signal is invalid.

3. The system of claim 2, further comprising:
a residual generator coupled to receive the estimates and the sensor signals and operable, in response thereto, to generate residuals, each residual representative of a difference between an estimate and a sensor signal.

4. The system of claim 3, wherein:
the gas turbine engine observer includes a non-linear component map model of the gas turbine engine;
the gas turbine engine observer is further configured to generate a plurality of state biases, each state bias being generated as a function of one of the generated residuals;
the non-linear component map model is coupled to receive at least a subset of the state biases; and
the non-linear component map model is configured to be updated in response to the state biases received thereby.

5. The system of claim 4, further comprising:
an observer mode select function operable to selectively supply one or more of the state biases to the non-linear component map model.

6. The system of claim 5, wherein the observer mode select function is coupled to receive a mode control signal representative of sensor signals that are invalid and is operable, in response thereto, to supply state biases associated with the sensor signals that are valid to the non-linear component map model.

7. The system of claim 5, further comprising:
a plurality of ambient condition sensors, each ambient condition sensor operable to (i) sense an ambient condition associated with the gas turbine engine and (ii) supply an ambient condition signal representative thereof,
wherein the gas turbine engine observer is further configured to correct at least a portion of the generated residuals based on the one or more determined ambient operating conditions.

8. The system of claim 5, wherein the gas turbine engine observer further includes a plurality of piecewise linear gains and is further operable to selectively apply one of the plurality of piecewise linear gains to each of the generated residuals.

9. The method of claim 8, further comprising:
a plurality of ambient condition sensors, each ambient condition sensor operable to (i) sense an ambient condition associated with the gas turbine engine and (ii) supply an ambient condition signal representative thereof,
wherein the gas turbine engine observer is further configured to correct the applied piecewise linear gain based on the one or more determined ambient operating conditions.

10. The system of claim 1, further comprising:
a plurality of engine sensors, each engine sensor configured to sense one of the engine operational parameters and supply a sensor signal representative the sensed engine operational parameter.

11. The system of claim 1, wherein the sensed engine operational parameters include (i) parameters representative of engine performance and (ii) parameters representative of controlled engine parameters.

12. A method of controlling a gas turbine engine having engine actuators, the method comprising the steps of:
sensing engine operational parameters and supplying, for each sensed engine operational parameter, a sensor signal representative thereof;
generating a gas turbine engine observer, the gas turbine engine observer responsive to engine actuator commands and at least some of the sensed engine operational parameters to supply estimates of each sensed engine operational parameter;
supplying engine actuator commands from an engine control law to the gas turbine engine observer and to the engine actuators;
determining if each of the sensor signals is invalid; and
for each of the sensed engine operational parameters, supplying a feedback signal representative thereof to the engine control law, the supplied feedback signal being (i) the sensor signal representative of the engine operational parameter if the sensor signal is valid and (ii) the estimate of the sensed engine operational parameter if the sensor signal is invalid.

13. The method of claim 12, further comprising:
for each of the sensed engine operational parameters, comparing the estimate supplied by the gas turbine engine observer to the sensor signal to generate residuals.

14. The method of claim 13, wherein the gas turbine engine observer includes a non-linear component map model of the gas turbine engine, and wherein the method further comprises:
generating a plurality of state biases, each state bias being generated as a function of a residual; and
updating the non-linear component map model using at least a subset of the generated state biases.

15. The method of claim 14, further comprising:
updating the non-linear component map model using the generated state biases associated with the sensor signals that are valid.

16. The method of claim 13, further comprising:
determining one or more ambient conditions associated with the gas turbine engine; and
correcting at least a portion of the generated residuals based on the one or more determined ambient operating conditions.

17. The method of claim 13, further comprising:
selectively applying one of a plurality of piecewise linear gains to each of the generated residuals.

18. The method of claim 17, further comprising:
determining one or more ambient conditions associated with the gas turbine engine; and
correcting the applied piecewise linear gain based on the one or more determined ambient operating conditions.

19. The method of claim 12, wherein the engine operational parameters include (i) parameters representative of engine performance and (ii) parameters representative of controlled engine parameters.

20. A gas turbine engine system, comprising:
a gas turbine engine including a plurality of actuators and a plurality of sensors, each sensor operable to sense an engine operational parameter and supply a sensor signal representative thereof, and
an engine controller coupled to the gas turbine engine adapted to receive input commands and a plurality of feedback signals, each feedback signal representative of a sensed engine operational parameter, the engine controller operable, in response to the input commands and the plurality of feedback signals, to supply at least engine actuator commands to the plurality of engine actuators, the engine controller including:
an engine control law adapted to receive the input commands and the plurality of feedback signals and operable, in response thereto, to supply the engine actuator commands,
a gas turbine engine observer adapted to receive the engine actuator commands and at least a portion of the sensor signals and operable, in response thereto, to supply estimates of each of the sensed engine operational parameters; and
a feedback signal selection function adapted to receive the estimates of the sensed engine operational parameters and each of the sensor signals, the feedback signal selection function configured to selectively supply each of the feedback signals representative of a sensed engine operational parameter as either (i) the sensor signal representative thereof or (ii) the estimate thereof.

21. A control system for a machine including a plurality of actuators, the system comprising:
a control law adapted to receive input commands and a plurality of feedback signals, each feedback signal representative of a sensed machine operational parameter, the control law operable, in response to the input commands and the plurality of feedback signals, to supply machine actuator commands;
a machine observer adapted to receive the machine actuator commands and a plurality sensor signals, each sensor signal representative of one of the sensed machine operational parameters, the machine observer operable, in response to the machine actuator commands and the sensor signals, to supply estimates of each of the sensed machine operational parameters; and
a feedback signal selection function adapted to receive the estimates of the sensed machine operational parameters and the plurality of sensor signals, the feedback signal selection function configured to selectively supply each of the feedback signals representative of a sensed machine operational parameter as either (i) the sensor signal representative thereof or (ii) the estimate thereof.

* * * * *